(12) United States Patent
Matthews

(10) Patent No.: US 8,577,537 B2
(45) Date of Patent: Nov. 5, 2013

(54) METHODS AND SYSTEMS FOR OPTIMIZING PERFORMANCE OF VEHICLE GUIDANCE SYSTEMS

(75) Inventor: Paul Matthews, Bel Aire, KS (US)

(73) Assignee: Agco Corporation, Duluth, GA (US)

( * ) Notice: Subject to any disclaimer, the term of this patent is extended or adjusted under 35 U.S.C. 154(b) by 1224 days.

(21) Appl. No.: 12/336,105

(22) Filed: Dec. 16, 2008

(65) Prior Publication Data

US 2010/0152943 A1 Jun. 17, 2010

(51) Int. Cl.
*A01D 91/00* (2006.01)
*A01D 41/127* (2006.01)
*G06F 17/00* (2006.01)
*G06F 19/00* (2011.01)
*B60Q 11/00* (2006.01)

(52) U.S. Cl.
USPC ........... 701/25; 701/36; 701/41; 701/423; 340/440; 56/10.2 R

(58) Field of Classification Search
USPC ......... 701/1, 23, 25, 29, 36, 41, 50, 200, 207, 701/208, 213, 42, 49, 70, 72, 93, 94, 124, 701/400, 408, 423, 425, 466, 468; 340/438, 340/439, 988, 995.12, 440, 995.1; 56/1, 56/10.2 R, 10.2 F
See application file for complete search history.

(56) References Cited

U.S. PATENT DOCUMENTS

| | | | |
|---|---|---|---|
| 6,212,448 B1 * | 4/2001 | Xydis | 701/23 |
| 6,285,930 B1 * | 9/2001 | Dickson et al. | 701/28 |
| 7,225,060 B2 * | 5/2007 | O'Connor et al. | 701/1 |
| 7,580,783 B2 * | 8/2009 | Dix | 701/50 |

* cited by examiner

*Primary Examiner* — Thomas Tarcza
*Assistant Examiner* — Edward Pipala
(74) *Attorney, Agent, or Firm* — Hovey Williams LLP

(57) ABSTRACT

A vehicle guidance system includes a location determining component for determining locations of the vehicle; a weight sensor for sensing a weight associated with the vehicle; a steering actuator for steering at least one wheel of the vehicle; and a computing device in communication with the location determining component, the weight sensor, and the steering actuator. The computing device receives cartographic data representative of a desired path for the vehicle, receives location information from the location determining component, controls operation of the steering actuator in order to guide the vehicle along the desired path, and adjusts a steering parameter at least partially based on the weight sensed by the weight sensor.

16 Claims, 4 Drawing Sheets

METHODS AND SYSTEMS FOR OPTIMIZING PERFORMANCE OF VEHICLE GUIDANCE SYSTEMS

BACKGROUND

1. Field

Embodiments of the present invention relate to vehicle guidance systems. More particularly, embodiments of the invention relate to methods and systems for optimizing performance of vehicle guidance systems.

2. Related Art

Vehicle guidance systems are used in many types of vehicles to assist drivers in reaching a desired location and/or following a desired path. For example, tractors and other agricultural vehicles are often equipped with vehicle guidance systems to assist operators in following a desired route across a field, such as a route consisting of parallel paths a specified distance apart. The ability to accurately and consistently follow a specific route reduces overlap or underlap of chemicals, seeds, fertilizers, or other applications, improves weed control and seed/plant establishment, reduces overall driving distance, saves fuel and time, and reduces operator fatigue.

A vehicle's architecture, such as front wheel steering, rear wheel steering, etc., can affect its steering performance. Furthermore, ground conditions, the addition of an implement such as a trailer hitched to a vehicle, and/or changes in the payload weight or other weight associated with the vehicle may also contribute to a vehicle's steering performance. These and other variable factors can affect a vehicle guidance system's ability to get the vehicle to a desired path in a timely, comfortable, and optimal manner.

Vehicle guidance systems typically use control algorithms to direct vehicles from location to location. Some guidance systems allow an operator to vary different parameters of the control algorithms to maintain a desired steering performance independent of the vehicle architecture. For example, operators of some vehicle guidance systems may adjust a user-configurable steering parameter such as steering gain or sensitivity to accommodate for varying vehicle architectures, attachments, and ground conditions. However, if the parameters for the control algorithms or the user-configurable steering parameters are not set correctly, optimal steering performance may not be achieved. For example, selecting a user-configurable steering parameter value that is too high can make the steering system too aggressive and cause over-steering. Selecting a user-configurable steering parameter value that is too low can make the steering system response too sluggish and cause under-steering. Many guidance systems permit operators to manually adjust such steering parameters, but there is a point at which an operator can't detect a need for an adjustment or distinguish the resultant change in performance.

Accordingly there is a need for an improved system and method for dynamically and accurately optimizing performance of a vehicle guidance system during vehicle operation.

SUMMARY

Embodiments of the present invention solve the above-described problems and/or other problems by providing methods and systems for optimizing the performance of vehicle guidance systems.

One embodiment of the invention is a method for optimizing performance of a vehicle guidance system to account for weight changes during operation of the vehicle. The method comprises: receiving data representative of a payload or other weight associated with the vehicle; and setting or adjusting a steering parameter of the guidance system at least partially based on the weight. The weight may be the weight of the vehicle itself, the weight of a load carried in the vehicle, and/or the weight of a pulled implement or other item. The steering parameter may be a gain setting of the guidance system or any other parameter or setting related to vehicle steering. In a particular embodiment, the method increases the steering gain as the weight of the vehicle or other weight increases and decreases the steering gain as the weight decreases.

Another embodiment of the invention is a vehicle guidance system comprising: a location determining component for determining locations of the vehicle; a payload sensor for sensing a weight associated with the vehicle; a steering actuator for steering at least one wheel of the vehicle; and a computing device in communication with the location determining component, the payload sensor, and the steering actuator. The computing device is configured for receiving cartographic data representative of a desired path for the vehicle, receiving location information from the location determining component, controlling operation of the steering actuator to guide the vehicle along the desired path, and adjusting a steering parameter at least partially based on the weight sensed by the payload sensor.

These and other important aspects of the present invention are described more fully in the detailed description below. The invention is not limited to the particular methods and systems described herein. Other embodiments may be used and/or changes to the described embodiments may be made without departing from the scope of the claims that follow the detailed description.

BRIEF DESCRIPTION OF THE DRAWINGS

Embodiments of the present invention are described in detail below with reference to the attached drawing figures, wherein.

Figure 1:
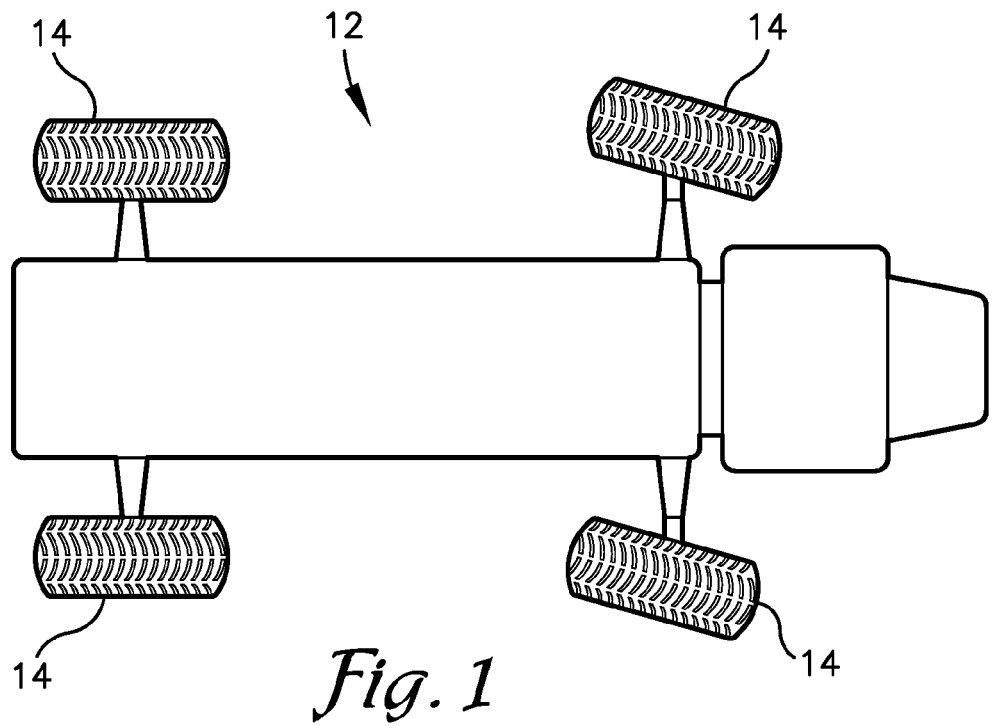
FIG. 1 is a schematic plan view of a vehicle in which the vehicle guidance system of the present invention may be mounted.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawing figures that illustrate specific embodiments in which the present invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense.

Figure 2:
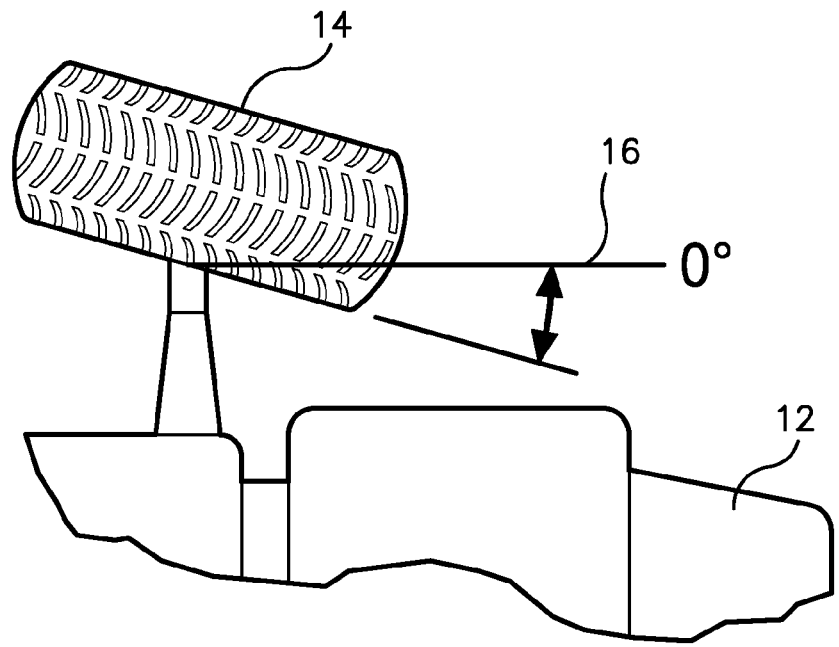
FIG. 2 is a fragmentary plan view of the vehicle of FIG. 1 showing steering of one of its wheels.

Embodiments of the present invention provide a vehicle guidance system 10 that may be mounted in and/or on a vehicle 12. The vehicle 12 may be an agricultural vehicle, automobile, all-terrain vehicle, or any other type of land-based vehicle. In a particular embodiment, the vehicle 12 is a tractor, combine, windrower, applicator, truck or any other self-propelled vehicle primarily used for farming or other agricultural purposes. As illustrated in FIGS. 1 and 2, the vehicle 12 may include a plurality of wheels 14, with at least one wheel being operable to turn, pivot, and/or rotate about a center axis 16 to steer the vehicle 12. Alternatively, the vehicle 12 may include steerable belts and tracks rather than wheels.

Figure 3:
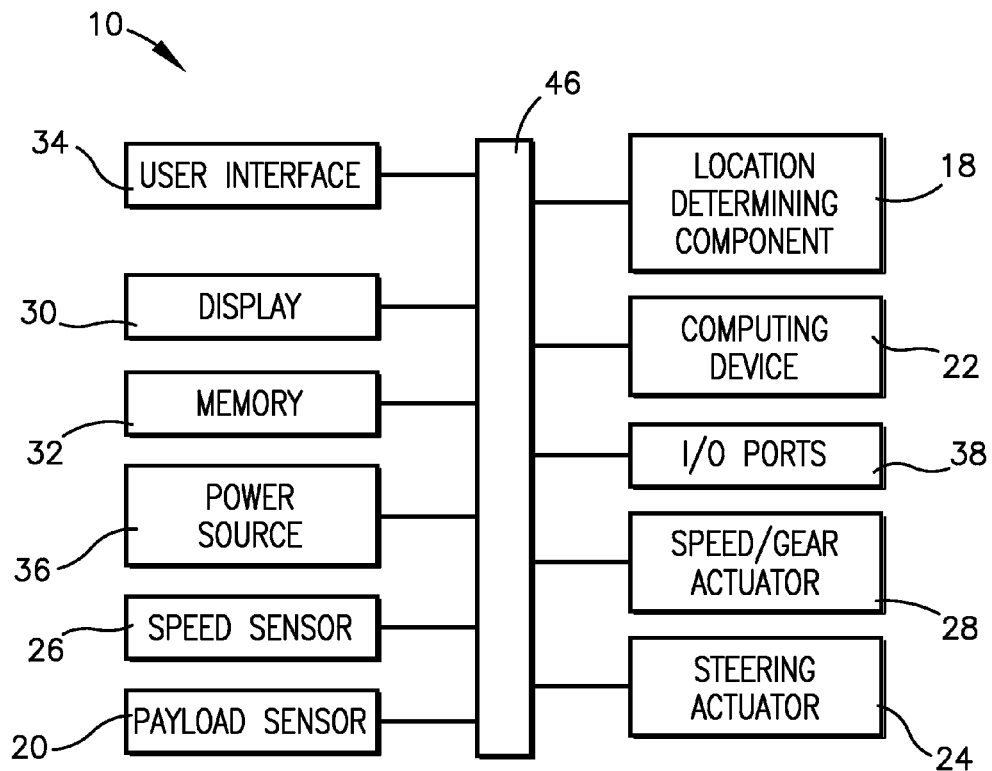
FIG. 3 is a block diagram illustrating certain components of an embodiment of the vehicle guidance system.

The vehicle guidance system 10 can be implemented in hardware, software, firmware, or a combination thereof. An exemplary embodiment of the vehicle guidance system 10 is illustrated in FIG. 3 and may comprise a location-determining component 18, a payload sensor 20, at least one computing device 22, and a steering actuator 24. Other embodiments of the guidance system 10 may also comprise a speed sensor 26, a speed/gear actuator 28, a display 30, memory 32, a user interface 34, a power source 36, and one or more I/O ports 38. As explained in more detail below, the computing device 22 is operable to adjust a steering parameter, such as a steering gain, steering sensitivity, steering force, etc., of the vehicle 12 or the vehicle guidance system 10 at least partially based on data from the payload sensor 20.

In more detail, the location-determining component 18 determines locations or positions of the vehicle 12 as it is moved from place to place and generates and sends corresponding position data to the computing device 22. In one embodiment, the location-determining component 18 may be a satellite navigation receiver that works with a global navigation satellite system (GNSS) such as the global positioning system (GPS) operated by the United States, the GLONASS system operated the Soviet Union, or the Galileo system operated by Europe.

Figure 4:
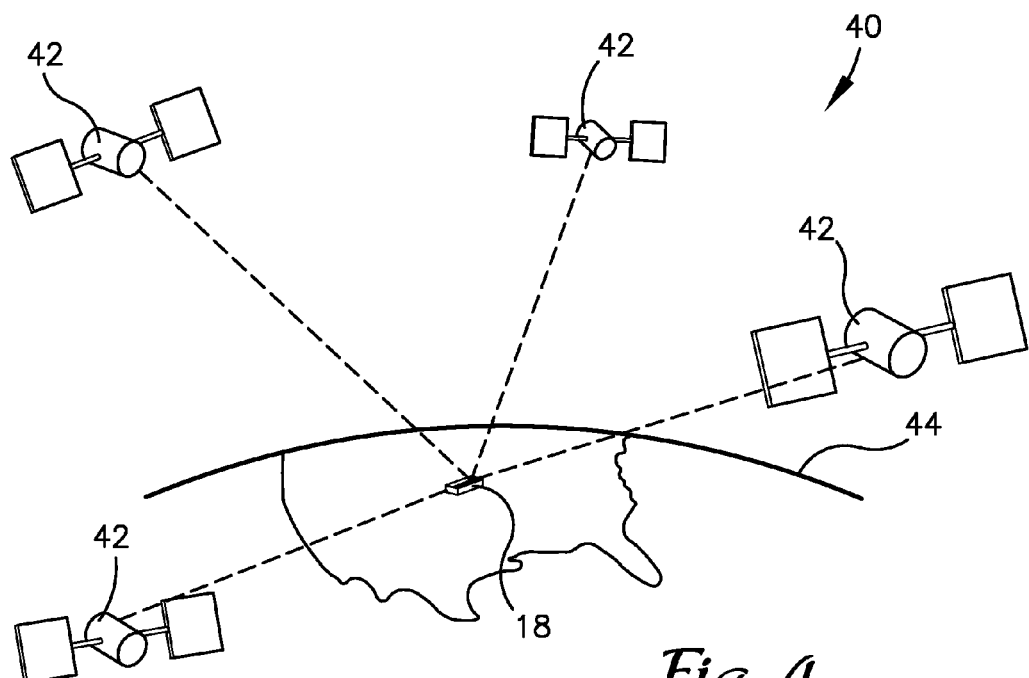
FIG. 4 is a schematic diagram of a global navigation satellite system (GNSS) that may be used to send navigation signals to the vehicle guidance system of FIG. 1.

FIG. 4 shows a representative view of a GNSS denoted generally by reference numeral 40. A plurality of satellites 42 are in orbit about the Earth 44. The orbit of each satellite is not necessarily synchronous with the orbits of other satellites and, in fact is likely asynchronous. A location-determining component, such as the component 18, receives the spread spectrum GPS satellite signals from the various satellites 42 and calculates its position as a function of the signals.

The spread spectrum signals continuously transmitted from each satellite 42 utilize a highly accurate frequency standard accomplished with an extremely accurate atomic clock. Each satellite 42, as part of its data signal transmission, transmits a data stream indicative of that particular satellite. The location-determining component 18 acquires spread spectrum GPS satellite signals from at least three satellites to calculate its two-dimensional position by triangulation. Acquisition of an additional signal, resulting in signals from a total of four satellites, permits the location-determining component 18 to calculate its three-dimensional position.

The location-determining component 18 may include an antenna to assist in receiving the satellite signals. The antenna may be a any type of antenna that can be used with navigational devices to receive satellite signals. The location determining component 18 sends calculated positional information to the computing device 22 to determine track logs or any other series of geographic coordinates corresponding to points along a path traveled by the vehicle 12. The computing device 22 may also be operable to calculate routes to desired positions, provide instructions to navigate to the desired positions, display maps and other information on the display screen 2, and execute other functions as described herein.

Although one embodiment of the vehicle guidance system 10 describes the location-determining component 18 as a GNSS receiver, it is noted that equivalents may be employed and substitutions made without departing from the scope of the invention as recited in the claims. For example, in other embodiments of the invention, the location determining component 18 need not directly determine its current geographic position. For instance, the location determining component 18 may determine the current geographic position by receiving position information directly from the user, through a communications network, or from another electronic device.

The location determining component 18 may include one or more processors, controllers, or other computing devices and memory so that it may calculate position and other geographic information without the computing device 22. Further, the location determining component 18 may be integral with the computing device 22 such that the location determining component 18 may be operable to specifically perform the various functions described herein. Thus, the computing device 22 and location determining component 18 can be combined or be separate or otherwise discrete elements.

The payload sensor 20 may measure any weight associated with the vehicle 12 including the weight of the vehicle itself, the weight of a load carried by the vehicle, and/or the weight of an implement, wagon, or other item pulled by the vehicle. The payload sensor 20 may also sense weight indirectly, for example with a grain level sensor that measures the height and/or amount of grain carried or pulled by the vehicle. The payload sensor 20 may employ any weight measuring technology including strain gauges, spring or shock deflection sensing devices, load cells, level sensors, etc.

Importantly, the weight of the vehicle 12, its load, or pulled items may change over time. For example, if the vehicle 12 is a combine, it may get heavier as it gathers grain. If the vehicle is an applicator or is pulling an applicator, it may get lighter as it applies chemicals, fertilizers, seeds, etc. Therefore, the payload sensor 20 preferably periodically or continuously monitors the weight of the vehicle or a related item and sends corresponding data to the computing device 22 as described in more detail below.

The computing device 22 may include any number of processors, controllers, integrated circuits, programmable logic devices, or other computing devices and resident or external memory for storing data and other information accessed and/or generated by the vehicle guidance system 10. The computing device 22 is preferably coupled with the other components of the guidance system through wired or wireless connections, such as a data bus 46, to enable information to be exchanged between the various components.

The computing device 22 may implement a computer program and/or code segments to perform the functions described herein. The computer program may comprise an ordered listing of executable instructions for implementing logical functions in the computing device 22 such as the steps illustrated in FIG. 6 and described below. The computer program can be embodied in any computer-readable medium for use by or in connection with an instruction execution system, apparatus, or device, and execute the instructions. In the context of this application, a "computer-readable medium" can be any means that can contain, store, communicate, propagate, or transport the program for use by or in connection with the instruction execution system, apparatus, or device. The computer-readable medium can be, for example, but not limited to, an electronic, magnetic, optical, electromagnetic, infrared, or semi-conductor system, apparatus, device or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

In some embodiments, the computing device 22 may be comprise a control module programmed with control algorithms and operable to receive real-time position information from the location determining component 18, weight data from the payload sensor 20, and desired path parameters from any external or internal source. The control module may process this data in order to produce a plurality of output commands, such as desired wheel speed and desired wheel angle for given points in time. The output commands are used to generate a steering signal to be sent to the steering actuator 24. The guidance system 10 may additionally receive user input from the user interface 34 when the system 10 is placed in a "manual" mode. Additionally, the guidance system may receive user input to define an acceptable amount of deviation between the actual angle of the wheels and the desired angle.

The steering actuator 24 is operable to steer one or more of the vehicle's wheels 14 in response to control signals from the vehicle guidance system 10. The steering actuator 24 may employ any known actuator technologies including hydraulic or mechanical actuators, electro mechanical actuators, or full electrical actuator systems. A feedback system may monitor the actual amount of steering provided by the steering actuator 24 to permit the guidance system 10 to compensate for any detected steering errors.

The speed sensor 26 is conventional and detects or monitors the speed of the vehicle 12. Likewise, the speed/gear actuator 28 is conventional and controls a speed and/or the gears of the vehicle 12 in response to control signals from the vehicle guidance system 10.

The display 30 may be used to display various information corresponding to the vehicle 12 and its guidance system 10, such as maps, positions, and directions as described below. The display 30 may comprise conventional black and white, monochrome, or color display elements including CRT, TFT, LCD, and/or plasma display devices. Preferably, the display 30 is of sufficient size to enable a user to easily view it while driving the vehicle 12. The display 30 may be integrated with the user interface 34, such as in embodiments where the display 30 is a touch-screen display to enable the user to interact with it by touching or pointing at display areas to provide information to the guidance system 10.

The memory 32, may be integral with the location determining component 18, integral with the computing device 22, stand-alone memory, or a combination of both. The memory may include, for example, removable and non-removable memory elements such as RAM, ROM, flash, magnetic, optical, USB memory devices, and/or other conventional memory elements.

The memory 32 may store various data associated with the operation of the guidance system 10, such as the computer program and code segments mentioned above, or other data for instructing the computing device 22 and system elements to perform the steps described herein. Further, the memory 32 may store various cartographic data corresponding to geographic positions including map data and map elements, such as thoroughfares, terrain, alert positions, points of interest, geographic entities, radio stations, and other navigation data to facilitate the various navigation functions provided by the vehicle guidance system 10. Additionally, the memory 32 may store cartographic data for desired paths or routes across a field and other data for later retrieval by the computing device 22. The various data stored within the memory 32 may also be associated within one or more databases to facilitate retrieval of the information.

The user interface 34 permits a vehicle operator or user to operate the vehicle guidance system 10. The user interface 34 may comprise one or more functionable inputs such as buttons, switches, scroll wheels, a touch screen associated with the display 30, voice recognition elements such as a microphone, pointing devices such as mice, touchpads, tracking balls, styluses, a camera such as a digital or film still or video camera, combinations thereof, etc. Further, the user interface 34 may comprise wired or wireless data transfer elements such as a removable memory including the memory 32, data transceivers, etc., to enable the vehicle operator and other devices or parties to remotely interface with the guidance system 10. The system 10 may also include a speaker for providing audible instructions and feedback.

The user interface 34 may be operable to provide various information to the user utilizing the display 30 or other visual or audio elements such as a speaker. Thus, the user interface 34 enables the user and guidance system 10 to exchange information relating to the guidance system 10, including geographic entities, configuration information security information, preferences, route information, points of interests, alerts and alert notification, navigation information, waypoints, a destination address, etc.

The power source 36 provides electrical power to at least some of the guidance system 10 components. For example, the power source 36 may be directly or indirectly coupled with the location-determining component 18, the computing device 22, the display 30, the memory 32, and the user interface 32. The power source 36 may comprise conventional power supply elements such as batteries, battery packs, etc. The power source 36 may also comprise power conduits, connectors, and receptacles operable to receive batteries, battery connectors, or power cables.

The I/O ports 38 permit data and other information to be transferred to and from the computing device 22 and the location-determining component 18. The I/O ports 38 may include a TransFlash card slot for receiving removable TransFlash cards and a USB port for coupling with a USB cable connected to another computing device such as a personal computer. Navigational software, cartographic maps, and other data and information may be loaded in the guidance system 10 via the I/O ports 38.

Some of the components illustrated in FIG. 3 and described herein may be housed together in a protective enclosure. However, the components need not be physically connected to one another since wireless communication among the various components is possible and intended to fall within the scope of the present invention.

In operation, the vehicle guidance system 10 may automatically adjust a steering parameter of the vehicle 12 at least partially in accordance with weight data from the payload sensor 20. For example, the steering parameter may be adjusted to increase or decrease the force at which the steerable wheel 14 is turned either right or left, thereby affecting the steering response, sensitivity, or the reaction time for the wheel 16 to reach the desired angle as commanded by the vehicle guidance system 10.

Figure 5:
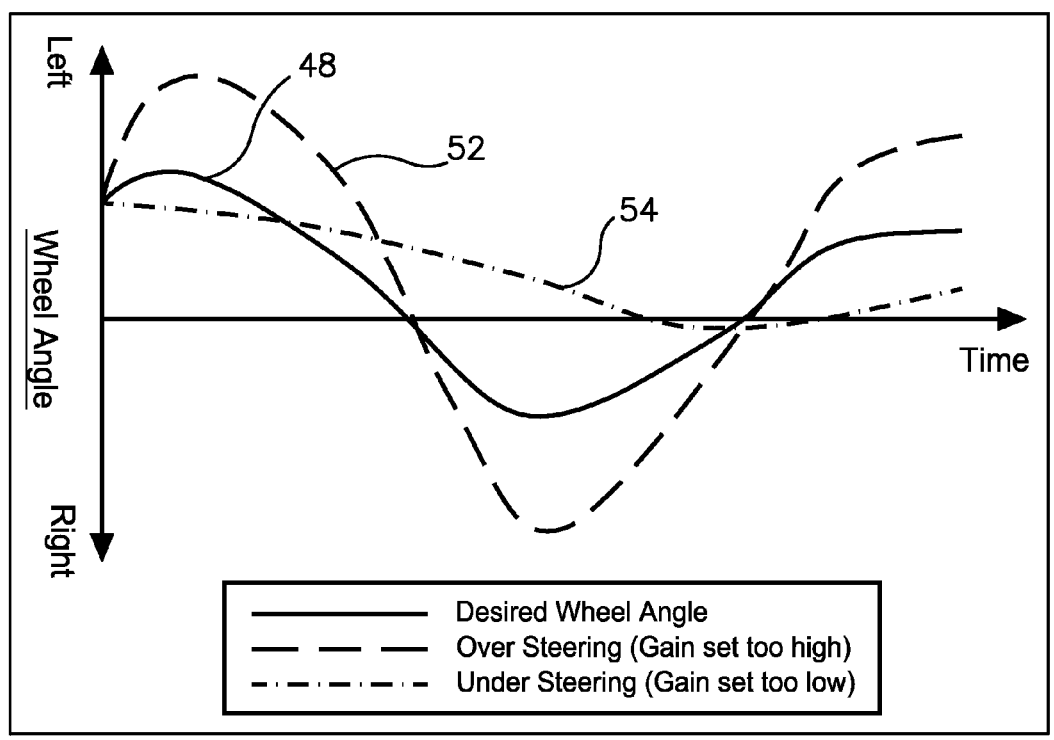
FIG. 5 is a graph of two example sets of data of the actual angles of steerable wheels compared with the desired angles of the steerable wheels over a period of time.

For example, as illustrated in FIG. 5, the vehicle guidance system 10 may define a desired wheel angle 48 for a plurality of points in time based on a desired path, thereby determining how far left and how far right the wheel 14 should turn at given points in time in order to precisely follow the desired path. It should be understood that the vehicle 12 may travel in a straight line when the wheel 14 is aligned with the center axis 16. The center axis 16 therefore represents a zero-degree turn of the wheel 14. The actual angles of the wheel 14 may be measured in respect to the center axis 16.

FIG. 5 graphs a first set of actual angles 50 and a second set of actual angles 52 to demonstrate under-steering and over-steering. The first set of actual angles 52 demonstrates over-steering, meaning the user-configurable steering parameter, referred to as gain in this example, is set too high. Notice that, at most points in time, the over-steered actual angle 52 exceeds the desired angle 48 in the same direction from the center axis 16 as the desired angle 48. The second set of actual angles 54 demonstrates under-steering, meaning the user-configurable steering parameter, or steering gain in this example, is set too low. Notice that, at most points in time, the under-steered actual angle 54 is either less than the desired angle 48 or in the opposite direction from the center axis 16 as the desired angle 48. A small amount of deviation of the vehicle 12 from the desired path may be acceptable in various situations.

Figure 6:
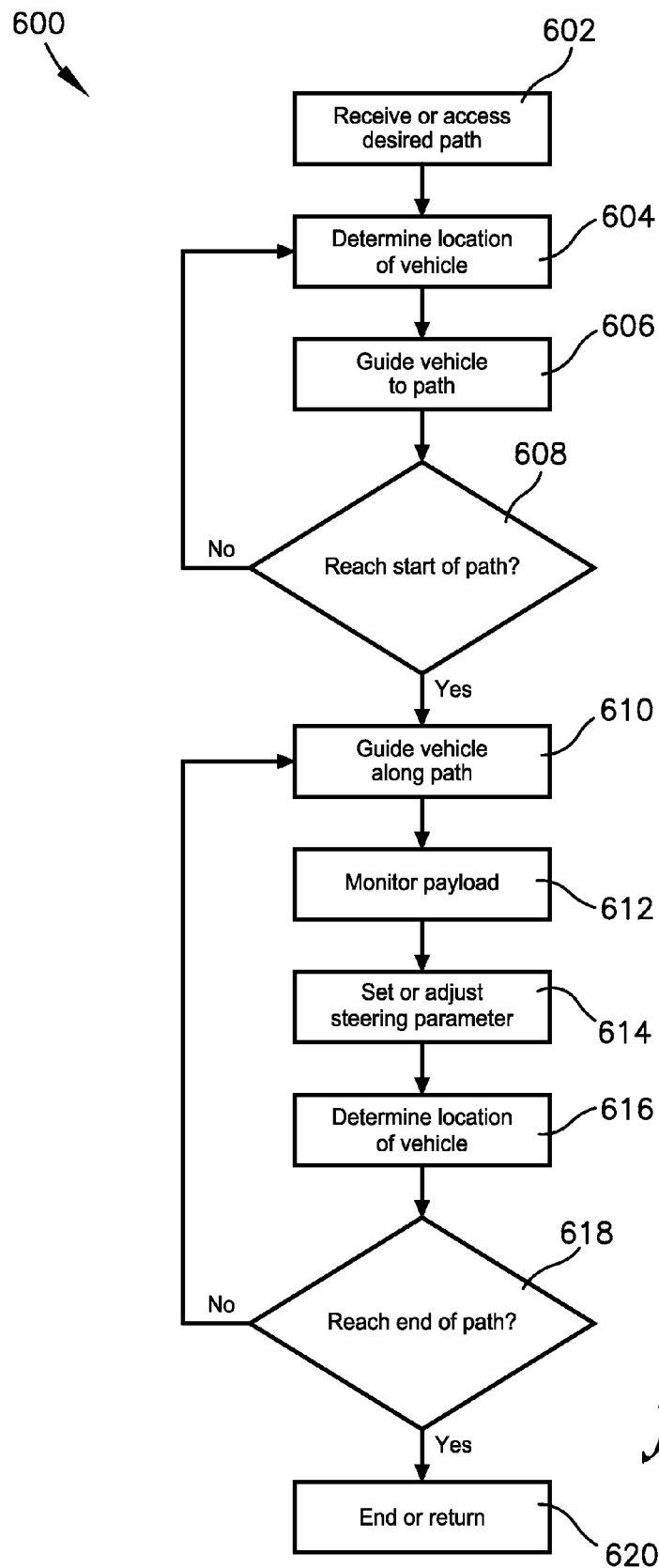
FIG. 6 is a flow chart illustrating selected steps of a method in accordance with embodiments of the invention.

FIG. 6 illustrates certain steps in an exemplary method 600 of using the vehicle guidance system 10 or a similar device. Some or all of the steps may be implemented by the computing device 22, by computer programs stored in or accessed by the computing device 22, or by other components in communication with the computing device 22. The particular order of the steps illustrated in FIG. 6 and described herein can be altered without departing from the scope of the invention. For example, some of the illustrated steps may be reversed, combined, or even removed entirely.

In step 602, the guidance system 10 or other device receives or otherwise accesses cartographic data or other data that represents a desired route or path across a field or other area. For example, the route may consist of a number of parallel paths in a field a specified distance apart. The route may take into account the boundaries of the field and any known obstacles such as buildings, trees, fences, etc. The guidance system 10 or other device may display several optional routes or paths and permit the vehicle operator to select one. The route data may be obtained from any source such as a separate computer or network running conventional agricultural mapping software.

In step 604, the guidance system 10 or other device determines the current location of the vehicle 12. As mentioned above, this may be done with the location determining component 18 or any other device or method capable of calculating the location of the vehicle. Although FIG. 6 only depicts several steps in which the location of the vehicle is determined, the guidance system 10 or other device may periodically or continuously receive updated location data to accurately pinpoint the location of the vehicle at all times.

In step 606, the guidance system 10 or other device guides the vehicle 12 to the start of the desired path. This may be done by providing visual or audible turn instructions to the vehicle operator or by providing steering and control signals to the steering actuator 24 and speed/gear actuator 28 to automatically guide the vehicle to the starting location.

In step 608, the computing device 22 or other device compares the current location of the vehicle 12 with the starting point of the desired path. If the vehicle has reached the starting point, the method proceeds to step 610, otherwise it repeats steps 604-608 until the starting point is reached.

Once the vehicle reached the starting point of the desired path, step 610 guides the vehicle along the path. This may be done by providing visual or turn instructions to the vehicle operator or by providing steering and control signals to the steering actuator 24 and speed/gear actuator 28.

In accordance with an important aspect of the present invention, the vehicle guidance system 10 or other device periodically or continuously receives data representative of a weight of the vehicle, a weight of the vehicle's load, a weight of a pulled implement, or any other weight associated with the vehicle as depicted in step 612. The weight data may be provided by the payload sensor 20 or any other device capable of measuring weight and providing corresponding signals to the computing device 22 or other device. As discussed above, the weight of the vehicle 12 or the weight of a related item may increase or decrease as the vehicle travels along the desired path, so the computing device 22 preferably obtains updated weight data at least periodically and preferable nearly continuously.

As the computing device 22 or other device receives the weight data, it sets, adjusts, or otherwise compensates a steering parameter of the vehicle 12 at least partly in accordance with the weight data as depicted in step 614. The computing device may, for example, increase or decrease a steering gain or sensitivity level of the guidance system 10 and/or the steering actuator 24. In a particular embodiment, the computing device 22 may increase the steering gain to increase the aggressiveness or sensitivity of the guidance system 10 or steering actuator 24 as the weight increases and decreases the sensitivity of the guidance system 10 or steering actuator 24 as the weight decreases.

The relationship between the measured weight and steering parameter may be linear or non-linear depending on various different factors including the type and characteristics of the vehicle, the characteristics of the field over which the vehicle travels, characteristics of the desired path, etc. Similarly, the degree of adjustment to the steering parameter may depend on the type and characteristics of the vehicle, the field, and the desired path. For example, the steering gain may be adjusted more for vehicles with poor turning abilities and less for vehicles with excellent turning abilities. Similarly, the steering gain may be adjusted more for wet fields than for dry fields.

In step 616, the guidance system 10 or other device again determines the current location of the vehicle 12. As mentioned above, this may be done continuously or at least periodically.

As the guidance system 10 guides the vehicle along the desired path, the location determining component 18 or other device periodically or continuously compares the current location of the vehicle with the ending point of the desired path as depicted in step 618. Once the vehicle 12 reaches the end of the desired path, the method terminates or returns to some other function at step 620. Otherwise, it repeats steps 610-618 until the vehicle completes the desired path.

Although the invention has been described with reference to the embodiments illustrated in the attached drawings, it is noted that equivalents may be employed and substitutions made herein without departing from the scope of the invention as recited in the claims. For example, the methods disclosed herein and illustrated in FIG. 6 may be performed in any order and steps may be added or deleted without departing from the scope of the invention as recited in the claims. Also, the user-configurable steering parameter may include parameters such as steering gain, steering sensitivity, steering force, etc.

The above-described system 10 and method 600 advantageously set or adjust a steering parameter of a vehicle or a vehicle guidance system based at least partially on a weight associated with the vehicle. This optimizes the performance of the vehicle guidance system without requiring manual intervention.

Having thus described an embodiment of the invention, what is claimed as new and desired to be protected by Letters Patent includes the following:

1. A method for optimizing performance of a guidance system for a vehicle, the method comprising:
    receiving data representative of a weight associated with a periodically changing payload towed by the vehicle, an overall possible weight change of the payload being equivalent to a weight of the vehicle; and
    setting or adjusting a steering parameter of the guidance system at least partially based on the weight such that the guidance system steers the vehicle in a manner that compensates for the weight,
    wherein the receiving and setting steps are automatically performed by a computing device of the guidance system.

2. The method as set forth in claim 1, wherein the weight computing device adjusts the steering parameter of the guidance system based on the changing payload.

3. The method as set forth in claim 1, wherein the steering parameter is a steering gain setting.

4. The method as set forth in claim 3, wherein the setting or adjusting step comprises the step of increasing the steering gain setting when the weight increases.

5. The method as set forth in claim 3, wherein the setting or adjusting step comprises the step of decreasing the gain steering when the weight decreases.

6. The method as set forth in claim 1, further comprising the steps of:
    periodically receiving updated data representative of updated weights associated with the payload towed by the vehicle as the vehicle is driven; and
    periodically setting or adjusting the steering parameter at least partially in response to the updated data.

7. The method as set forth in claim 6, wherein the steering parameter is a steering gain setting and the periodically setting or adjusting step comprises the step of increasing the steering gain setting as the weight associated with the payload towed by the vehicle increases.

8. The method as set forth in claim 7, wherein the periodically setting or adjusting step further comprises the step of decreasing the steering gain setting as the weight associated with the payload towed by the vehicle decreases.

9. A guidance system for a vehicle, the guidance system comprising:
    a location determining component for determining a location of the vehicle;
    a weight sensor for sensing a weight associated with a periodically changing payload towed by the vehicle, an overall possible weight change of the payload being equivalent to a weight of the vehicle;
    a steering actuator for steering at least one wheel of the vehicle; and
    a computing device in communication with the location determining component, the steering actuator, and the weight sensor, the computing device being configured for accessing cartographic data representative of a desired path for the vehicle, receiving location information from the location determining component, controlling operation of the steering actuator in accordance with the location information in order to guide the vehicle along the desired path, periodically receiving data representative of an updated weight associated with the load towed by the vehicle as the vehicle is driven along the path, and adjusting a steering gain setting at least partially based on the weight sensed by the weight sensor by increasing the steering gain setting when the weight increases and decreasing the steering gain setting when the weight decreases.

10. The guidance system as set forth in claim 9, wherein the weight sensor indirectly senses the weight by gauging an amount of a substance corresponding to the load.

11. The guidance system as set forth in claim 9, wherein the guidance system is operable to receive a user input to define an acceptable amount of deviation of an actual angle of the wheel and a desired angle of the wheel.

12. The guidance system as set forth in claim 9, wherein the guidance system is operable to be switched to a manual mode wherein the controlling operation of the steering actuator is performed by a user.

13. The guidance system as set forth in claim 9, further comprising:
    a feedback system operable to monitor an actual heading change and send data representative of the actual heading change to the computing device to compensate for a difference between the actual heading change and an intended heading change.

14. A guidance system for a vehicle, the guidance system comprising:
    a global navigation satellite system (GNSS) receiver for determining a location of the vehicle;
    a weight sensor for sensing a weight associated with a periodically changing payload towed by the vehicle, an overall possible weight change of the payload being equivalent to a weight of the vehicle;
    a steering actuator for steering at least one wheel of the vehicle; and
    a computing device in communication with the location determining component, the weight sensor, and the steering actuator, the computing device being configured for—
        accessing cartographic data representative of a desired path for the vehicle,
        periodically obtaining location information from the location determining component,
        controlling operation of the steering actuator in order to guide the vehicle along the desired path,
        periodically receiving weight data representative of a current weight of the load towed by the vehicle as the vehicle is driven along the desired path,
        periodically setting or adjusting a steering parameter at least partially in response to the weight data.

15. The guidance system as set forth in claim 14, wherein the steering parameter is a steering gain setting and wherein the computing device increases the gain setting as the weight of the payload towed by the vehicle increases.

16. The guidance system as set forth in claim 15, wherein the computing device decreases the gain setting as the weight of the payload towed by the vehicle decreases.

* * * * *